United States Patent
Uehara et al.

Patent Number: 5,370,330
Date of Patent: Dec. 6, 1994

[54] ONE-WAY CLUTCH FOR A FISHING REEL WITH AN IMPROVED CONTACT SURFACE CONFIGURATION

[75] Inventors: Masayuki Uehara; Kazuo Hirano; Nobuyuki Yamaguchi, all of Tokyo, Japan

[73] Assignee: Daiwa Seiko, Inc., Tokyo, Japan

[21] Appl. No.: 185,273

[22] Filed: Jan. 24, 1994

Related U.S. Application Data

[63] Continuation of Ser. No. 837,880, Feb. 20, 1992, abandoned.

[30] Foreign Application Priority Data

Feb. 28, 1991 [JP] Japan .............. 3-017023[U]
Feb. 28, 1991 [JP] Japan .............. 3-017024[U]

[51] Int. Cl.⁵ ............................... A01K 89/02
[52] U.S. Cl. ........................................ 242/247
[58] Field of Search ............. 242/247, 248, 257; 192/45, 38; 384/567

[56] References Cited

U.S. PATENT DOCUMENTS

| | | | |
|---|---|---|---|
| 3,537,555 | 11/1970 | Reister | 192/45 |
| 4,427,307 | 1/1984 | Norlander et al. | 384/567 |
| 4,614,312 | 9/1986 | Ban | 242/257 |
| 4,828,085 | 5/1989 | Lederman | 192/45 |
| 4,828,086 | 5/1989 | Lederman | 192/45 |
| 4,881,699 | 11/1989 | Emura | 242/248 |
| 4,989,704 | 2/1991 | Morishita | 192/45 |
| 5,020,738 | 6/1991 | Yamaguchi | 242/247 |
| 5,042,741 | 8/1991 | Aota | 242/248 |
| 5,067,598 | 11/1991 | Ritter | 192/45 |
| 5,119,919 | 6/1992 | Iga | 192/45 |

Primary Examiner—Daniel P. Stodola
Assistant Examiner—Eileen A. Dunn
Attorney, Agent, or Firm—Longacre & White

[57] ABSTRACT

A one-way clutch of a fishing reel including an outer race; a plurality of rollers; and a retainer provided in the outer race for retaining the rollers inside of the outer race. The present invention is characterized in that an inner circumferential surface of the outer race is shaped as a polygon; free rotation spaces, in which the rollers are freely rotated, are defined on nook portions of the inner circumferential surface; and the other portions of the inner circumferential surface have rotation hindrance facets with which the rollers are put into contact so that the rollers are hindered from being rotated.

11 Claims, 8 Drawing Sheets

ONE-WAY CLUTCH FOR A FISHING REEL WITH AN IMPROVED CONTACT SURFACE CONFIGURATION

This is a continuation of application Ser. No. 07/837,880, filed Feb. 20, 1992, which was abandoned upon the filing hereof.

BACKGROUND OF THE INVENTION

The present invention relates to a one-way clutch which allows a rotary member to be rotated in a direction but prevents the member from being rotated in another direction.

There is a conventional one-way clutch comprising an outer race 1″, an inner race 10, a retainer 2″, and a plurality of slender cylindrical rollers 3″ housed in the retainer between the outer and the inner races, as shown in FIGS. 14 and 15. The clutch allows a rotary member to be rotated in a direction but prevents the member from being rotated in another direction. The movement of the rollers 3″ for a wedge effect at the time of the backward rotation of the clutch is small. The clutch can be easily fitted between the rotary member and a support member. The outer race 1″ is made of a cement steel plate high enough in strength against the wedge effect between the outer race and the rollers 3″ and is cylindrically shaped so that the outer race has an end portion extending in the radial direction of the race, a plurality of peripheral projections 1e each slenderly extending between both the ends of the race, recesses 1f formed inside the projections, inner sloped 1g formed inside the projections, and a through hole 1h formed inside the end portion so as to fit the inner race 10 in the hole. The outer race 1″ is thereafter subjected to nitriding and anticorrosive processing. After the retainer 2″ is put in the outer race 1″, the race is bend at one end thereof to have another end portion 1i for keeping the retainer from coming out the outer race.

Since the outer race 1″ has a relatively complicated form, there are problems that the race is expensive and it is difficult to keep the accuracy of the form of each of the recesses 1f and the slopes 1g high enough to stabilize the function of the clutch. The axial dimension of each of the rollers 3″ is large, while the outside diameter of the roller is small. When the outside diameter of the inner race 10 is small and the one-way clutch is included in a device whose rotational frequency at the clutch is low, no trouble takes place. However, when the inner race 10 is large in outside diameter and small in axial dimension and the clutch is included in a device whose rotational frequency at the clutch is high, troubles (1), (2) and (3) take place as follows:

(1) If the axial dimension of each of the slender cylindrical rollers is decreased for weight reduction or other purpose without changing the outside diameter of the roller, the pressure on the surface of he roller is heightened to make it likely that the roller is pressed onto the inner or outer race and locked thereon due to a rotative impact, or local flawing, deformation, wear or the like is accelerated.

(2) If the number of the rollers, which roll in slipping pressure contact with the inner race, is large, the power for rotating the clutch needs to be high. If the number of the rollers is small, the transmissible torque of the clutch is lowered in proportion to the number.

(3) If the outer race of the clutch, whose inner race is usually rotated at a high speed for the rapid rotation of the device, is rotated at a high speed for that purpose, the rollers are separated from the inner race due to a centrifugal force so as to delay the action of the clutch.

SUMMARY OF THE INVENTION

The present invention was made in order to eliminate the above-mentioned problems and troubles.

Accordingly, it is an object of the present invention to provide a one-way clutch in which the form of an outer race is made simpler to decrease the cost of the clutch, and the accuracy of the form of the inner circumferential surface of the outer race, on which a wedge effect is produced, is kept high to enhance and stabilize the function of the clutch. In the clutch, a retainer for retaining a plurality of rollers is provided inside the outer race. The inner circumferential surface of the outer race is shaped as a polygon. Free rotation spaces, in which the rollers are freely rotated, are defined on the nook portions of the inner circumferential surface of the outer race. The other portions of the surface have rotation hindrance facets with which the rollers are put into contact so that the rollers are hindered from being rotated. Each of the rollers is shaped as a disk so that the outside diameter of the roller is larger than the axial dimension thereof. When the outer race is rotated backward, the rollers are put into the free rotation spaces inside the nook portions of the inner circumferential surface of the outer race against the urging forces of springs so that the outer race is allowed to continue to be rotated backward. When the outer race is rotated forward, the rollers are put into contact with the rotation hindrance facets of the other portions of the inner circumferential surface of the outer race so that the outer race is prevented from being more rotated forward.

It is another object of the present invention to provide a one-way clutch in which the form of an outer race is made simpler to decrease the cost of the clutch, and the accuracy of the form of the inner circumferential surface of the outer race, on which a wedge effect is produced, is kept high to enhance and stabilize the function of the clutch. In the clutch, a retainer for retaining a plurality of rollers is provided inside the outer race. The inner circumferential surface of the outer race is shaped as a polygon. Free rotation spaces, in which the rollers are freely rotated, are defined on the hock portions of the outer circumferential surface of the outer race. The other portions of the surface have rotation hindrance facets with which the rollers are put into contact so that the rollers are hindered from being rotated. Each of the rollers is slenderly shaped so that the axial dimension of the roller is larger than the outside diameter thereof. When the inner race of the clutch is rotated forward, the slender rollers are put in the free rotation spaces inside the nook portions of the inner circumferential surface of the outer race so that the inner race is allowed to continue to be rotated forward. When the inner race is rotated backward, the slender rollers are put into contact with the rotation hindrance facets of the other portions of the inner circumferential surface of the outer race so that the wedge effect is produced on the rollers and the inner and the outer races to prevent the inner race from being more rotated backward.

Since the one-way clutches have the above-mentioned constitution and operation, each of the clutches has advantages mentioned from now on. The wedge effect is produced with the rollers surely and accurately during a long period of time so as to enable the clutch to function surely and stably during that period to allow the forward or backward rotation or prevent the backward or forward rotation. The form of the outer race is simpler. The accuracy of the form of the inner circumferential surface of the outer race, on which the wedge effect is produced, is kept high to stabilize the function of the clutch. The pressure on the surface of each of the rollers is reduced. For that reason, the roller is prevented from being pressed onto the inner or outer race and locked thereon even if receiving a rotative impact, the transmissible torque of the clutch is higher, and the life of the clutch is longer. The constitution of the clutch is simpler. When the clutch is included as a backward rotation preventing component in a fishing reel, the movement of the clutch for the action thereof is small and the backward rotation preventing operation of the clutch is always sure and stable. As for the clutch, each roller of which is shaped as a disk to make the outside diameter of the roller larger than the axial dimension thereof, a device including the clutch as a component can be made compact.

DETAILED DESCRIPTION OF THE PREFERRED EMBODIMENTS

Figure 1:
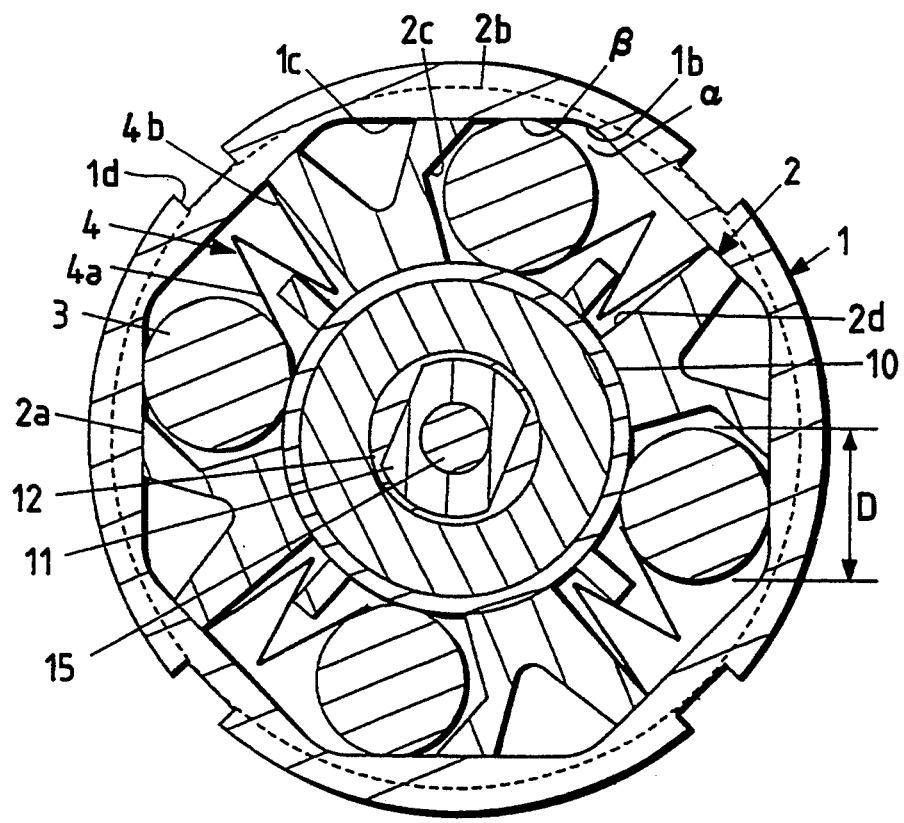
FIG. 1 is an enlarged cross-sectional view of a one-way clutch which is an embodiment of the present invention.

Embodiments of the present invention are hereafter described in detail with reference to the drawings attached hereto.

FIGS. 1, 2, 3, 4, 5 and 6 show the case that a one-way clutch which is one of the embodiments and is large in the outside diameter of the inner race of the clutch and small in the axial dimension thereof is included in a spinning reel for fishing. When the clutch is included in a device whose rotational frequency at the outer race of the clutch is high, the clutch functions more appropriately.

The one-way clutch comprises the outer race 1, a retainer 2 made of a synthetic resin, a plurality of disk-shaped rollers 3, a plurality of springs 4, and the inner race 10. The outer race 1 is made of a cement steel subjected to nitriding and anticorrosive processing after the shaping of the steel. The outer circumferential surface of the outer race 1 is circularly shaped. The inner circumferential surface of the outer race 1 is shaped as a regular octagon. The outer surfaces of the lateral portions 2a of the retainer 2 are fitted on the inner circumferential surface of the outer race 1. The axially inner surfaces of the other lateral portions 2b of the retainer 2 are located on one side 1a of the outer race 1. The disk-shaped rollers 3, the number of which is four, are retained in the through holes 2c of the retainer 2, located on the outer circumferential surface of the inner race 10, and urged by the springs 4. The radially inner surfaces of the lateral portions 2a and 2b of the retainer 2 are located on the outer circumferential surface of the inner race 10 so that the retainer serves as a bearing for the rollers 3. Free rotation spaces $\alpha$, in which the rollers 3 are freely rotated, are defined on the nook portions 1b of the inner circumferential surface of the outer race 1. The other portions 1c of the inner circumferential surface of the outer race 1 have rotation hindrance facets $\beta$ with which the rollers 3 are put into contact so that the rollers are hindered from being rotated. The outer circumferential surface of the outer race 1 has a plurality of recesses 1d.

Figure 2:
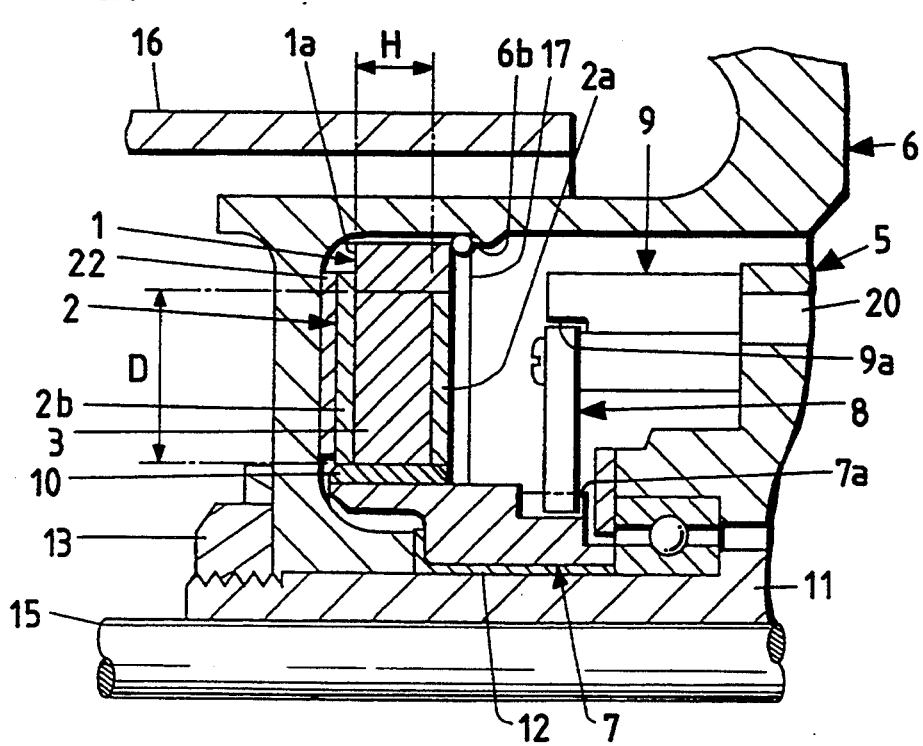
FIG. 2 is an enlarged longitudinally-sectional view of a major part of the clutch in the state that it is included in a spinning reel for fishing.

Each of the rollers 3 is made of a hard material such as a high-carbon chromium steel, and plated with nickel of about 2 to 20 $\mu$ in thickness. The outside diameter D of the roller 3 is larger than the axial dimension H thereof, as shown in FIG. 2.

Each of the springs 4 is shaped as N, located on the outer circumferential surface of the corresponding roller 3 at one end portion 4a of the spring, and fitted in the corresponding pit 2d of the retainer 2 at the other end portion 4b of the spring.

The operation of the one-way clutch is described from now on. When the outer race 1 is rotated counterclockwise as to FIG. 1, the rollers 3 are put into the free rotation spaces $\alpha$ against the urging forces of the springs 4 so that the outer race is allowed to continue to be rotated counterclockwise. When the outer race 1 is rotated clockwise as to FIG. 1, the rollers 3 are put into contact with the rotation hindrance facets $\beta$ of the outer race so that the outer race is prevented from being more rotated clockwise.

Although the inner circumferential surface of the outer race 1 is shaped as a regular octagon, the surface may be shaped as another regular polygon.

The spinning reel includes a body cover 5, a rotary quill 11 projecting forward from the cover, a collar 12 fitted on the quill, and a rotor 6 mounted on the quill in front of the collar and secured to the quill by a nut so that the rotor is unrotatable relative to the quill, and is rotated by turning a handle 14. The reel also includes a spool shaft 15 fitted in the rotary quill 11 and projecting therefrom, and a spool 16 supported on the spool shaft at the tip thereof so that the spool is moved back and forth in conjunction with the turning of the handle 14.

Figure 3:
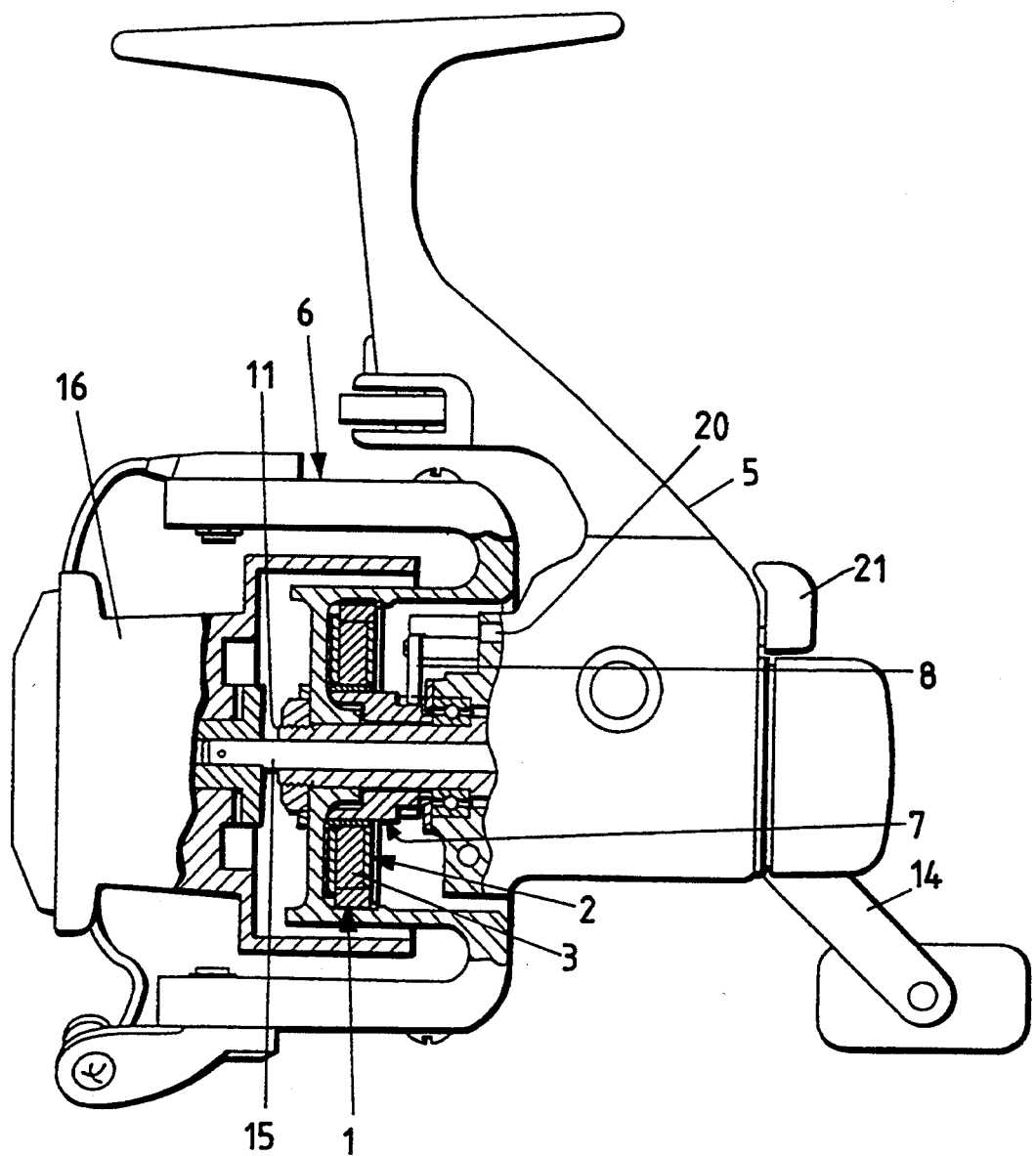
FIG. 3 is a longitudinally sectional view of the clutch in the state that it is included in the reel.
Figure 4:
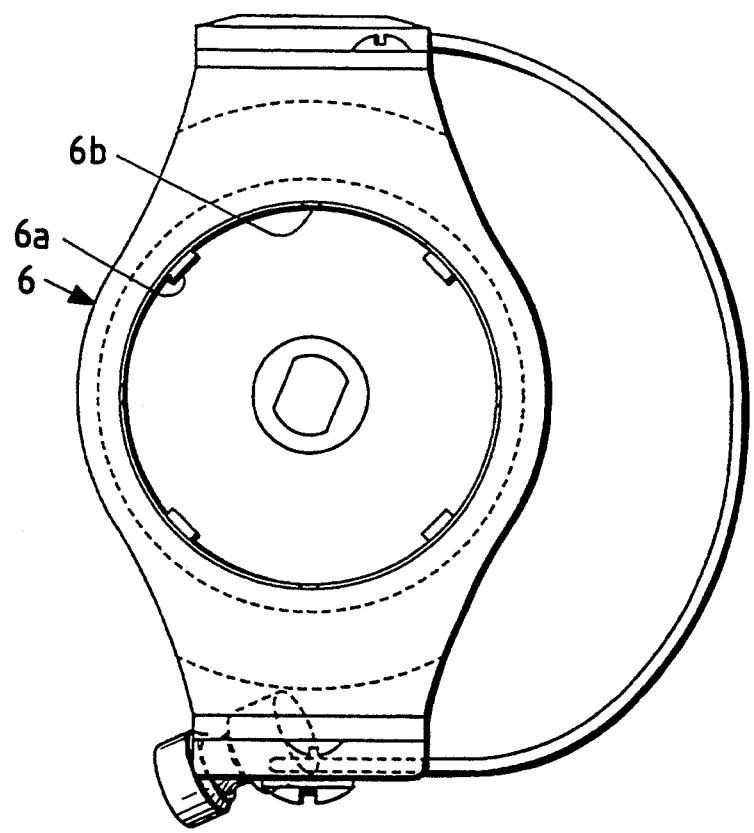
FIG. 4 is a rear view of the rotor of the reel.
Figure 5:
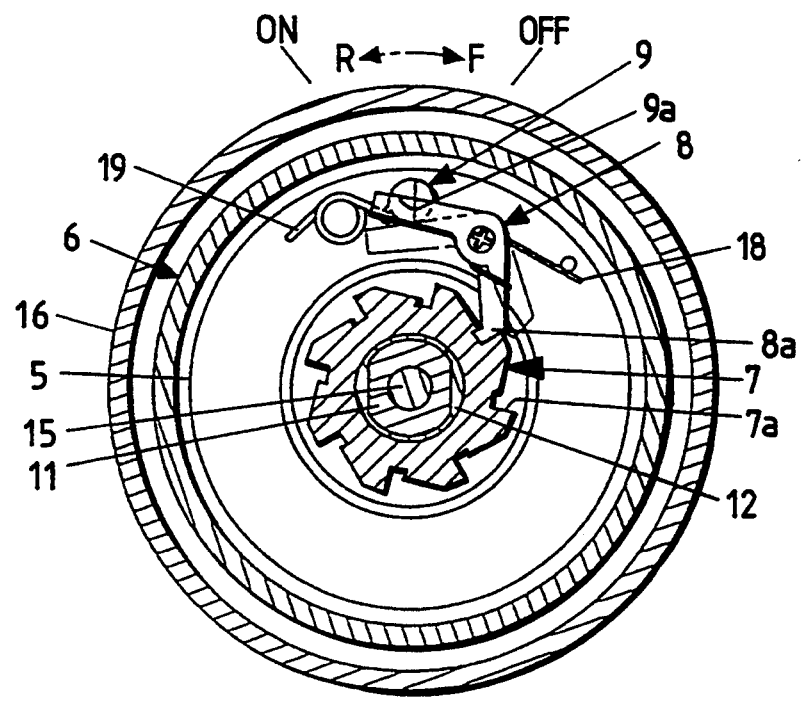
FIG. 5 is a cross-sectional view of a major part of the reel.
Figure 6:
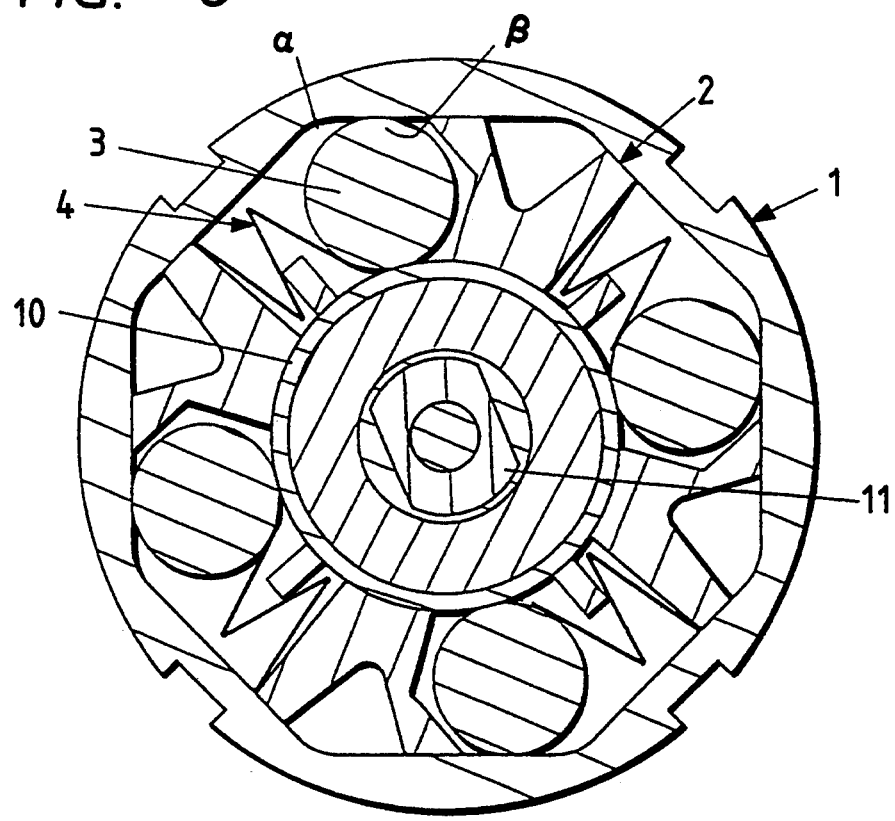
FIG. 6 is an enlarged cross-sectional view of the clutch.

The rotor 6 has a plurality of projections 6a and another projection 6b on the inner circumferential surface of the rotor. The projections 6a extend into the internal opening of the rotor 6, and are fitted in the recesses 1d of the outer race 1 of the clutch. A stop ring 17 made of a spring is engaged with the projection 6b as shown in FIG. 2. A backward rotation preventer 7 is rotatably supported on the collar 12. The inner race 10 of the clutch is fitted on the outer circumferential surface of the preventer 7 so that the inner race is unrotatable relative to the preventer. The preventer 7 constitutes a backward rotation preventing ratchet 7a. The tip 8a of a backward rotation preventing pawl 8 is located near the ratchet 7a so that the tip can be engaged with the ratchet, as shown in FIGS. 3 and 5. The pawl 8 is supported in a swingable manner by the body cover 5 of the reel, and urged by a spring 18 in such a direction as to be engaged with the ratchet 7a. The position of the pawl 8 is controlled by the cam 9a of the cam member 9 of the reel so that the pawl is engaged with the ratchet 7a or disengaged therefrom. A torsion spring 19 extends from the spring engagement portion of the cam 9a to the body cover 5 and is engaged with them. The cam member 9 is secured to the tip of a manipulation bar 20 projecting backward from the body cover 5. A knob 21 is secured to the bar 20. FIG. 5 shows the state of the reel that the tip 8a of the pawl 8 is engaged with the ratchet 7a by swinging the knob 21 down for engagement.

When the one-way clutch is to be installed in the internal opening of the rotor 6 of the reel, a buffer material 22 such as felt and leather is put in the opening at the bottom thereof, the retainer 2 of the clutch, the disk-shaped rollers 3 fitted in the retainer and the outer race 1 are put in the opening so as to place the lateral portions 2b of the retainer in front of the other lateral portions 2a thereof, the projections 6a of the rotor 6 are fitted in the recesses 1d of the outer race, and the stop ring 17 is engaged with the other projection 6b of the rotor.

The operation of the reel including the one-way clutch is described from now on. When the knob 21 remains swung down for engagement and the handle 14 is turned in such a direction as to wind a fishline on the spool 16, the rotary quill 11 and the rotor 6 are rotated forward or clockwise as to FIGS. 5 and 6 so that the outer race 1 is rotated forward or clockwise as to FIG. 6. As a result, the rollers 3 are put in the free rotation spaces $\alpha$ inside the nook portions 1b of the inner circumferential surface of the outer race so that the outer race is allowed to continue to be rotated forward. At that time, the tip 8a of the pawl 8 urged by the spring 18 remains engaged with the ratchet 7a so that the backward rotation preventer 7 is kept from being rotated. When the fishline is thereafter unwound from the spool 16 by the pull of a fish, the rotor 6 is rotated backward or counterclockwise as to FIG. 5 so that the outer race 1 is rotated backward or counter-clockwise as to FIG. 6. As a result, the rollers 3 are put out of the free rotation spaces $\alpha$ onto the rotation hindrance facets $\beta$ of the inner circumferential surface of the outer race 1 so that a wedge effect is produced on the rollers and the outer and the inner races 1 and 10 to prevent the outer race from being more rotated backward relative to the inner race. At that time, the tip 8a of the pawl 8 urged by the spring 18 remains engaged with the ratchet 7a so that the backward rotation preventer 7 is kept from being rotated counterclockwise relative to the body cover 5 of the reel. For the reason, the inner race 10 secured to the outer circumferential surface of the preventer 7 is kept from being rotated, so that the rotor 6 is prevented from being more rotated backward. At that time, since the movement of the rollers 3 for the wedge effect is small and the preventer 7 remains engaged with the pawl 8, the rotor 6 is very quickly prevented from being more rotated backward. If the knob 21 is swung down for disengagement in advance, the pawl 8 is swung counterclockwise against the urging force of the spring 18 by cam 9s of the cam member 9 as shown by a two-dot chain line in FIG. 5, so that the rotor 6 is allowed to continue to be rotated backward.

Since the outside diameter D of each of the disk-shaped rollers 3 is larger than the axial dimension H thereof and the number of the rollers is small enough to make the outside diameter large enough, the rollers are unlikely to be pressed onto the rotation hindrance facets $\beta$ of the inner circumferential surface of the outer race 1 and the outer circumferential surface of the inner race 10 and locked on them, even if the pressure between the facet and the outer circumferential surface drops and a rotative impact acts to the rollers. For that reason, the transmissible torque of the one-way clutch is higher, and the life of the clutch is longer. Since the number of the rollers 3 is smaller, the power for rotating them and the weight of the clutch are lower. Since the axial dimension of the clutch is smaller, the spinning reel including it can be made more compact.

Figure 7:
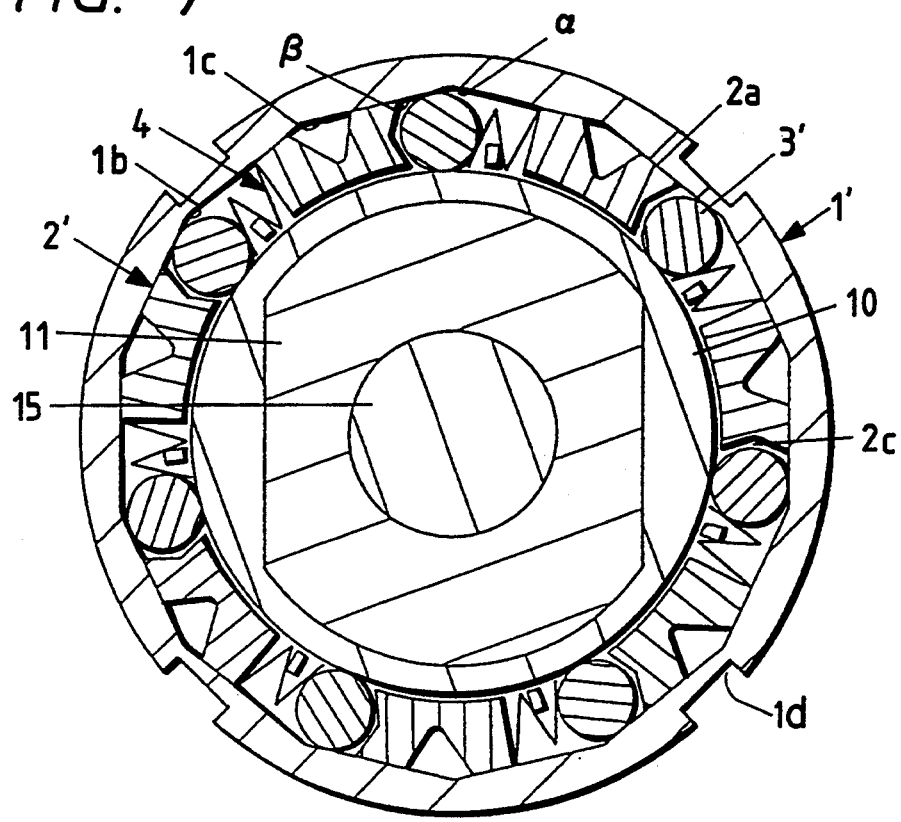
FIG. 7 is an enlarged cross-sectional view of a one-way clutch which is another embodiment of the present invention.
Figure 8:
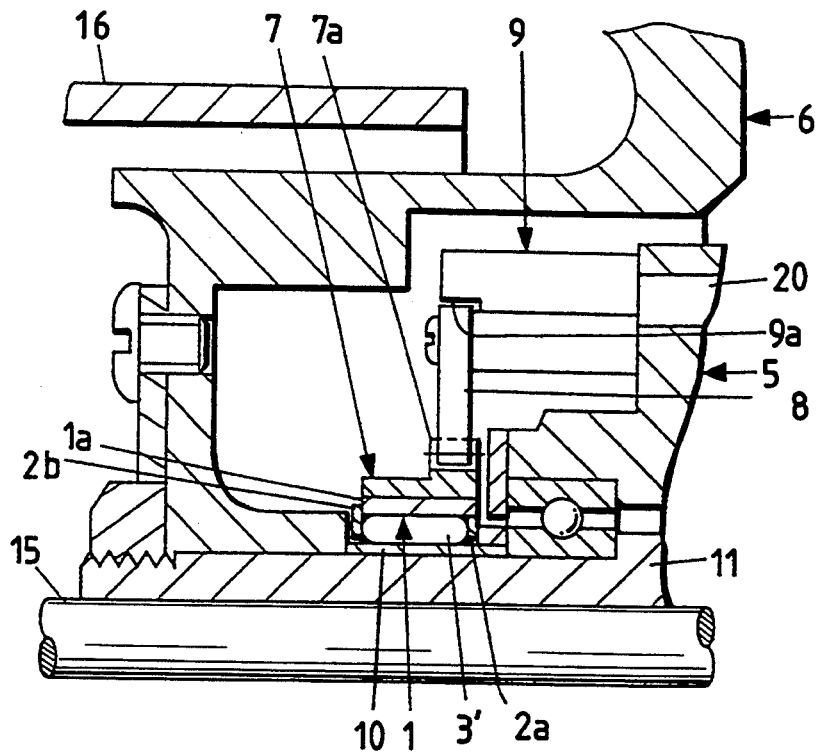
FIG. 8 is an enlarged longitudinally-sectional view of a major part of the latter clutch in the state that it is included in a spinning reel for fishing.
Figure 9:
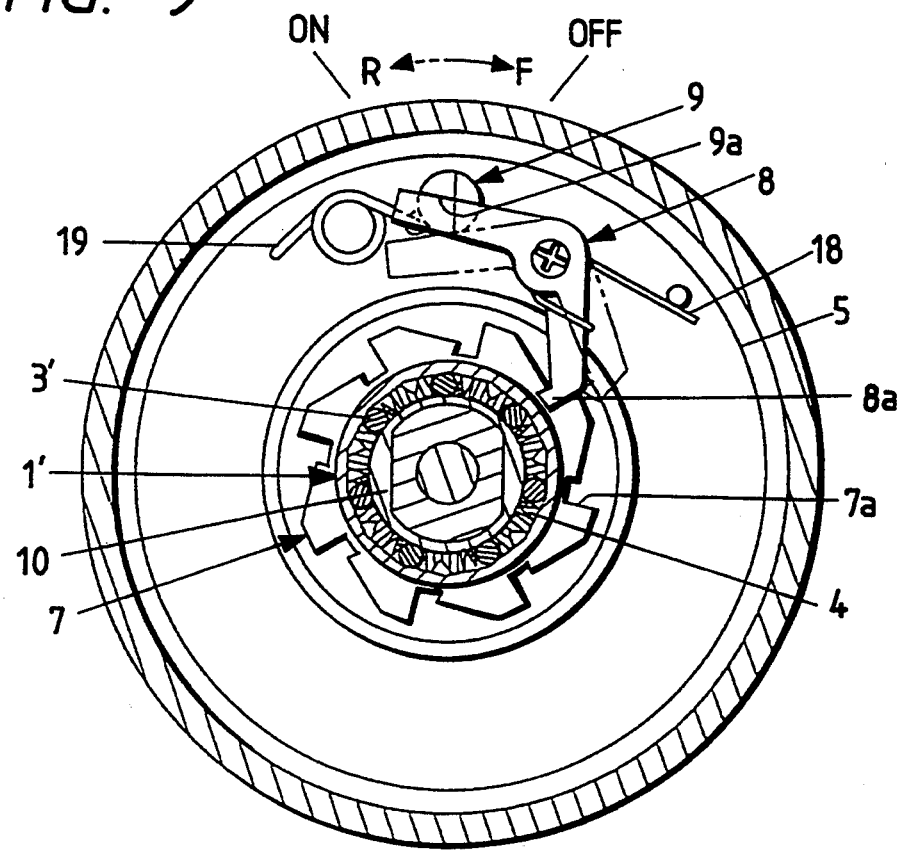
FIG. 9 is a cross-sectional view of a major part of the latter reel.

FIGS. 7, 8 and 9 show the case that a one-way clutch which is another of the embodiments is included in a spinning reel for fishing. The outside diameter of each slender roller 3' of the clutch is smaller than the axial dimension of the roller. The rotational frequency of the reel at the outer race 1' of the clutch is low. The clutch comprises the outer race 1' made of a cement steel subjected to nitriding and anticorrosive processing after the shaping of the steel, a retainer 2' made of a synthetic resin, a plurality of slender rollers 3', springs 4, and an inner race 10.

The outer circumferential surface of the outer race 1' is circularly shaped. The inner circumferential surface of the outer race 1' is shaped as a regular polygon of fourteen sides. The lateral portions 2a of the retainer 2' are fitted on the inner circumferential surface of the outer race 1'. The axially inner surfaces of the other lateral portions 2b of the retainer 2' are located on one side 1a of the outer race 1'. The former lateral portions 2a of the retainer 2' may be secured to the inner circumferential surface of the outer race 1' by press-fitting or the like. The slender rollers 3', the number of which is seven, are retained in the through holes 2c of the retainer 2', located on the outer circumferential surface of the inner race 10, and urged by the springs 4. Free rotation spaces $\alpha$, in which the rollers 3' are freely rotated, are defined on the nook portions 1b of the inner circumferential surface of the outer race 1'. The other portions 1c of the surface have rotation hindrance facets $\beta$ with which the rollers 3' are put into contact so that the rollers are hindered from being rotated. The outer circumferential surface of the outer race 1' has a plurality of recesses 1d.

The slender rollers 3' are made of a hard material such as a high-carbon chromium steel, and plated with nickel of about 2 to 20 $\mu$ in thickness. Each of the springs 4 is shaped as N, located on the outer circumferential surface of the corresponding roller 3' at one end portion 4a of the spring, and fitted in the corresponding pit 2d of the retainer 2' at the other end portion 4b of the spring.

The operation of the one-way clutch shown in FIGS. 7, 8 and 9 is described from now on. When the inner race 10 of the clutch is rotated clockwise as to FIG. 7, the slender rollers 3' are put in the free rotation spaces β inside the nook portions 1b of the inner circumferential surface of the outer race 1' so that the inner race is allowed to continue to be rotated clockwise. When the inner race 10 is rotated counterclockwise as to FIG. 7, the rollers 3' are put out of the free rotation spaces α onto the rotation hindrance facets β of the inner circumferential surface of the outer race 1' so that a wedge effect is produced on the rollers and the outer and the inner races 1' and 10 to prevent the inner race from being more rotated counterclockwise.

The difference of the spinning reel from the preceding one shown in FIGS. 1, 2, 3, 4, 5 and 6 is that the inner race 10 is fitted on the outer circumferential surface of a rotary quill 11 projecting forward from a body cover 5, and a rotor 6 is fitted on the quill in front of the inner race and secured to the quill by a nut 13 so as not to rotate relative to the quill. The one-way clutch is provided on the outer circumferential surface of the rotary quill 11. A backward rotation preventer 7 is secured to the outer circumferential surface of the outer race 1' of the clutch, and constitutes a backward rotation preventing ratchet 7a. The tip 8a of a backward rotation preventing pawl 8 is located near the ratchet 7a so that the tip can be engaged with the ratchet, as shown in FIG. 9. The pawl 8 is supported in a swingable manner by the body cover 5 of the reel, and urged by a spring 18 in such a direction as to be engaged with the ratchet 7a. The position of the pawl 8 is controlled by the cam 9a of the cam member 9 of the reel so that the tip of the pawl is engaged with the ratchet 7a or disengaged therefrom. A torsion spring 19 extends from the spring engagement portion of the cam 9a to the body cover 5, and is engaged with them. The cam member 9 is secured to the top of a manipulation bar 20 projecting backward from the body cover 5. A knob 21 is secured to the bar 20. FIG. 9 shows the state of the reel that the tip of the pawl 8 is engaged with the ratchet 7a by swinging the knob 21 down for engagement.

The operation of the spinning reel including the one-way clutch as shown in FIGS. 7, 8 and 9 is described from now on. When the knob 21 remains swung down for engagement and the handle 14 of the reel is turned in such a direction as to wind a fishline on the spool 16 of the reel, the rotary quill 11 and the rotor 6 are rotated forward clockwise as to FIG. 9 so that the inner race 10 of the clutch is rotated forward clockwise. As a result, the slender rollers 3' of the clutch are put in the free rotation spaces α inside the nook portions 1b of the inner circumferential surface of the outer race 1' so that the rotor 6 is allowed to continue to be rotated forward. At that time, the tip 8a of the pawl 8 urged by the spring 18 remains engaged with the ratchet 7a so that the backward rotation preventer 7 is kept from being rotated. When the fishline is thereafter unwound from the spool 16 by the pull of a fish, the rotor 6 is rotated backward counter-clockwise as to FIG. 9 so that the inner race 10 is rotated backward counterclockwise. As a result, the slender rollers 3' are put out of the free rotation spaces α onto the rotation hindrance facets β of the inner circumferential surface of the outer race 1' so that a wedge effect is produced on the rollers and the outer and the inner races 1' and 10 to prevent the inner race from being more rotated backward. At that time, the tip 8a of the pawl 8 urged by the spring 18 remains engaged with the ratchet 7a so that the backward rotation preventer 7 is kept from being rotated counterclockwise relative to the body cover 5 of the reel. For that reason, the outer race 1' secured to the inner circumferential surface of the preventer 7 is kept from being rotated, so that the rotor 6 is prevented from being more rotated backward. At that time, since the movement of the rollers 3' for the wedge effect is small and the backward rotation preventer 7 remains engaged with the pawl 8, the rotor 6 is very quickly prevented from being more rotated backward. If the knob 21 is swung down for disengagement in advance, the cam 9a of the cam member 9 swings the pawl 8 counterclockwise against the urging force of the spring 18 as shown by a two-dot chain line in FIG. 9, so that the rotor 6 is allowed to continue to be rotated backward.

Figure 10:
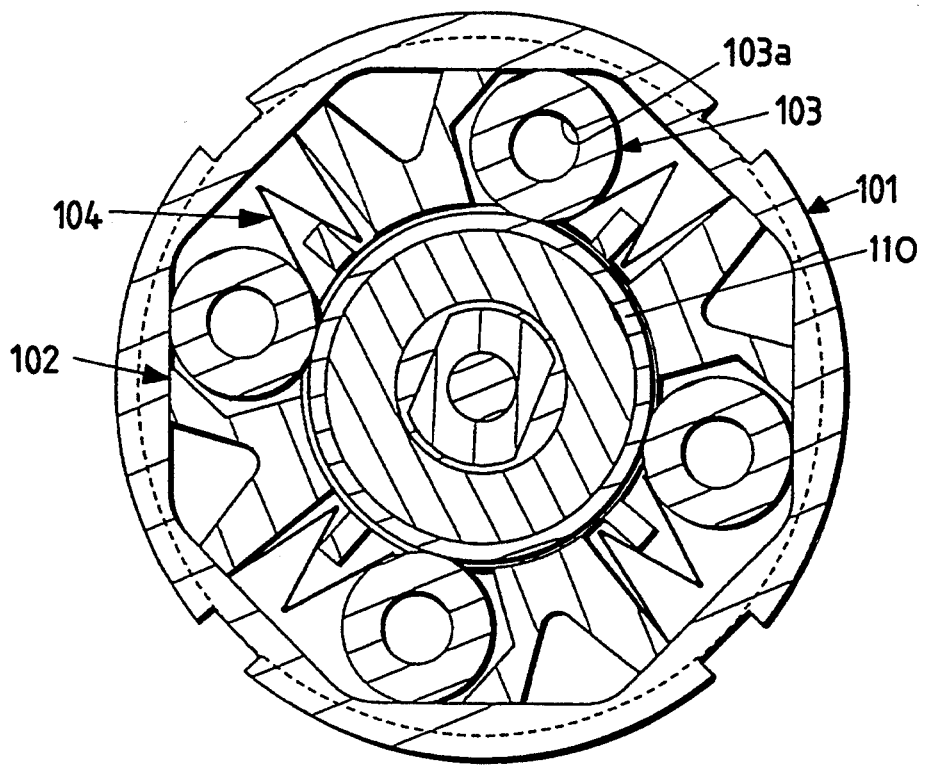
FIG. 10 is an enlarged cross-sectional view of a one-way clutch which is yet another embodiment of the present invention.

FIG. 10 shows a one-way clutch which is yet another of the embodiments. The difference of the clutch from the preceding one shown in FIGS. 1, 2, 3, 4, 5 and 6 is that the inner circumferential surface of a retainer 102 is located off the outer circumferential surface of an inner race 110, and disk-shaped rollers 103 have through holes 103a for weight reduction.

Figure 11:
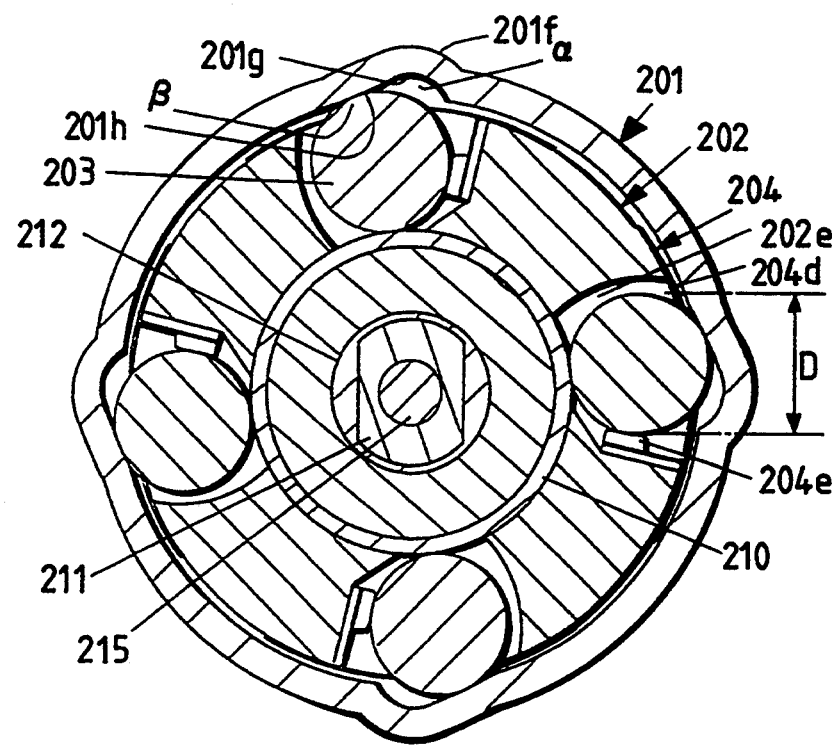
FIG. 11 is an enlarged cross-sectional view of a one-way clutch which is yet another embodiment of the present invention.
Figure 12:
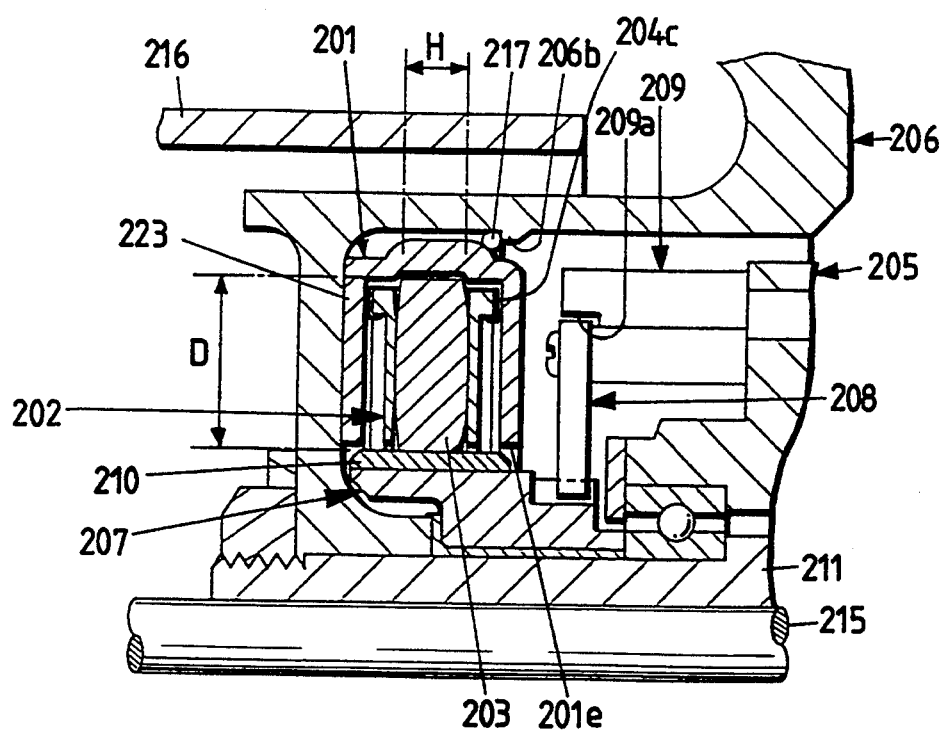
FIG. 12 is an enlarged longitudinally-sectional view of a major part of the last clutch in the state that it is included in a spinning reel for fishing.
Figure 13:
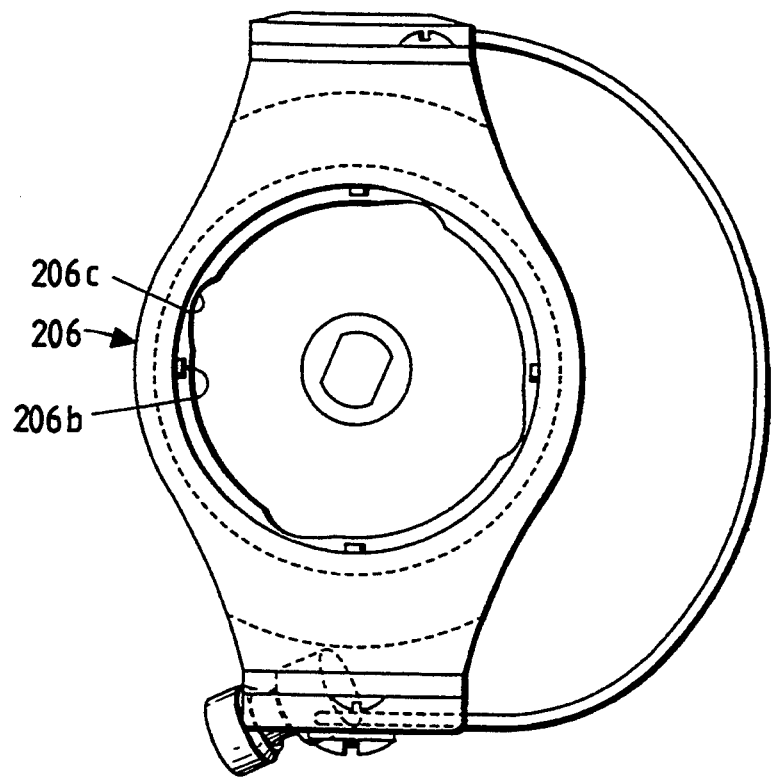
FIG. 13 is a rear view of the rotor of the reel shown in FIG. 12.
Figure 14:
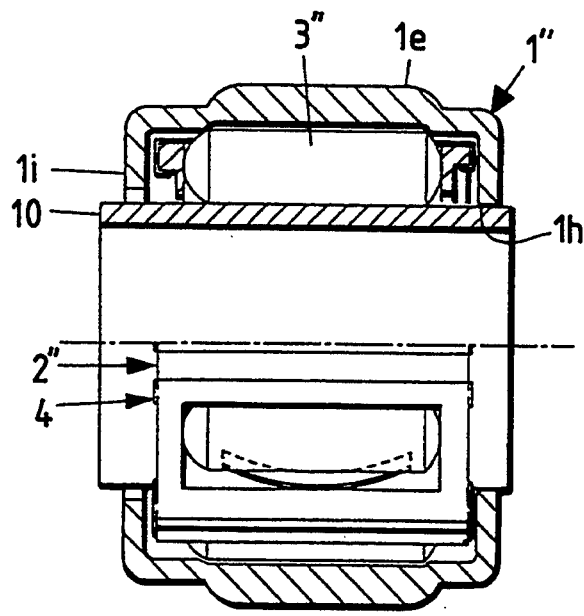
FIG. 14 is a longitudinally sectional view of a conventional one-way clutch.
Figure 15:
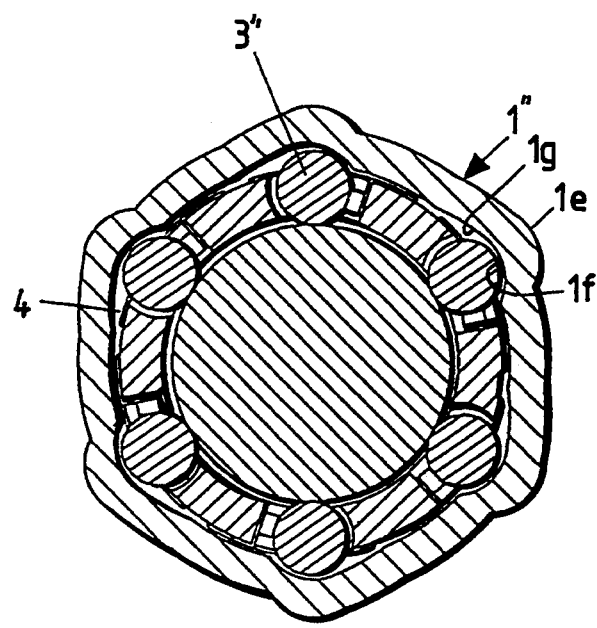
FIG. 15 is a cross-sectional view of the conventional one-way clutch.

FIGS. 11, 12 and 13 show the case that a one-way clutch which is yet another of the embodiments is included in a spinning reel for fishing. The clutch comprises an outer race 201, a retainer 202, four disk-shaped rollers 203, springs 204, an inner race 210, and a holding ring 223. The outer race 201 is made of a cement steel plate and shaped as a bottomed cylinder by deep-drawing, and has a through hole 201e which extends in the center of the bottom portion of the outer race and in which the inner race 210 is fitted. The outer race 201 has a plurality of projections 201f on the outer circumferential surface of the race. The inner circumferential surface of the outer race 201 is shaped as a deformed polygon so that the surface has nook portions 201g defining free rotation spaces α in which the rollers 203 are freely rotated, and the surface has other portions 201h having rotation hindrance facets β with which the rollers are put into contact so as to be hindered from being rotated. The retainer 202 is housed in the outer race 201. The four disk-shaped rollers 203 are retained in the through holes 202e of the retainer 202, located on the outer circumferential surface of the inner race 210, and urged by the springs 204. The springs 204 are located on the peripheral portions of the retainer 202, and attached to the retainer at both the bent side edge portions of the springs, and have rectangular through holes 204d and ben portions 204e bent inside the holes so as to push the rollers 203. The holding ring 223 is fixedly fitted in the outer race 201. Although the axial dimension of each roller 203 is small and both the sides thereof are partly spherical surfaces, as shown in FIG. 12, the roller is not confined thereto. The inner circumferential surface of the rotor 206 of the reel is formed with projections 206b which extend into the internal opening of the rotor and with which a stop ring 217 made of a spring is engaged as shown in FIG. 12, and recesses 206c which face the internal opening of the rotor and in which the projections 201f of the outer race 201 of the clutch are fitted. The clutch is substantially the same in other constitution as the clutch shown in FIGS. 1, 2, 3, 4, 5 and 6, and operates substantially in the same manner as the latter.

The present invention is not confined to the above-described embodiments, but may be embodied or practiced in other various ways without departing from the scope and spirit of the invention.

What is claimed is:

1. A one-way clutch of a fishing reel comprising:
   an outer race;
   a plurality of rollers; and
   a retainer provided in said outer race for retaining said rollers inside of said outer race,
   wherein an inner circumferential surface of said outer race is shaped as a substantially regular polygon having straight adjacent sides connected by curved sections;
      free rotation spaces, in which said rollers are freely rotated, are defined on nook portions of said inner circumferential surface; and
      other portions of said inner circumferential surface have rotation hindrance facets with which said rollers are adapted to contact so that said rollers are hindered from being rotated.

2. A one-way clutch according to claim 1, wherein each of said rollers comprises an outside diameter larger than an axial dimension thereof.

3. A one-way clutch according to claim 1, wherein said clutch is disposed between a fixed member and a drive member of the fishing reel.

4. A one-way clutch according to claim 3, wherein said clutch is provided in an internal opening of a rotor of the reel so that said clutch allows the rotor to be rotated in a forward direction to wind a fishline or prevents the rotor from being rotated in a backward direction to unwind the fishline.

5. A one-way clutch according to claim 3, wherein the reel includes:
   a body;
   a backward rotation preventer rotatably supported by said body, said preventer having an engagement portion;
   a backward rotation preventing member supported by said body so that said member can be displaced to be engaged with or disengaged from said engagement portion; and
   a rotary member rotated in conjunction with an unwinding of the fishline,
      wherein said preventer and said rotary member are connected to each other by said clutch.

6. A one-way clutch according to claim 1, wherein said outer race circumscribes said retainer.

7. A one-way clutch according to claim 1, wherein said outer race circumscribes an inner race, said inner race being adapted to contact said rollers.

8. A one-way clutch according to claim 1, wherein said retainer comprises pit means for receiving a portion of a spring.

9. A one-way clutch of a fishing reel comprising:
   an outer race having an inner circumferential surface defining a substantially regular polygon having straight adjacent sides connected by curved sections;
   a plurality of rollers; and
   a retainer provided in said outer race for retaining said rollers inside of said outer race,
      wherein each of said rollers comprises an outside diameter larger than an axial dimension thereof.

10. A one-way clutch according to claim 9, wherein said clutch is disposed between a fixed member and a drive member of the fishing reel.

11. A one-way clutch according to claim 9, wherein said rollers comprise through holes for weight reduction.

* * * * *